United States Patent
Matsumoto et al.

(10) Patent No.: US 9,212,011 B2
(45) Date of Patent: Dec. 15, 2015

(54) STACKING DEVICE AND METHOD OF PRODUCTION OF WEB MEMBER

(71) Applicant: Unicharm Corporation, Shikokuchuo-shi, Ehime (JP)

(72) Inventors: Takayuki Matsumoto, Kanonji (JP); Yoshio Yano, Kanonji (JP); Hiroyoshi Takada, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 55 days.

(21) Appl. No.: 13/749,717

(22) Filed: Jan. 25, 2013

(65) Prior Publication Data

US 2014/0193233 A1    Jul. 10, 2014

(30) Foreign Application Priority Data

Jan. 10, 2013    (JP) .................................. 2013-002855

(51) Int. Cl.
   *B65G 57/11*      (2006.01)
   *A47L 13/38*      (2006.01)

(52) U.S. Cl.
   CPC .................. *B65G 57/11* (2013.01); *A47L 13/38* (2013.01)

(58) Field of Classification Search
   CPC ........... B65H 31/32; B65H 2301/4212; B65H 2301/42622; B65H 29/26; B65H 29/34; B65G 57/06
   USPC .......................... 271/176, 182, 213, 214, 218; 414/792.7, 792.8, 793.4, 793.8, 793.9, 414/794, 794.1, 794.2, 794.3
   See application file for complete search history.

(56) References Cited

U.S. PATENT DOCUMENTS

| | | | | |
|---|---|---|---|---|
| 345,644 | A | * | 7/1886 | Moseman ...................... 271/224 |
| 470,898 | A | * | 3/1892 | Reiffel .......................... 271/224 |

(Continued)

FOREIGN PATENT DOCUMENTS

| | | |
|---|---|---|
| EP | 0546580 | 6/1993 |
| EP | 2009152 | 12/2008 |

(Continued)

OTHER PUBLICATIONS

International Search Report and Written Opinion Mailed Feb. 18, 2014, corresponds to International Application No. PCT/JP2013/085203.

(Continued)

*Primary Examiner* — Gregory Adams
(74) *Attorney, Agent, or Firm* — Hauptman Ham, LLP (57) ABSTRACT

A stacking device which stacks together web members which drop down while drawing a parabolic arc, this is provided with a horizontal movement limit part which limits movement of web members in a horizontal direction, a temporary supporting unit which can take a projecting position where it projects from the horizontal movement limit part and a retracted position where it is pulled in from the projecting position and does not stick out from the horizontal movement limit part, and a receiving table which is positioned under the temporary supporting means at the projecting position and stacks the web members. The temporary supporting unit temporarily supports a web member at the projecting position and, after that, shifts to the retracted position to make the web member drop under the temporary supporting unit, so that the stacking device stacks the web members on the receiving table.

14 Claims, 7 Drawing Sheets

(56) References Cited

U.S. PATENT DOCUMENTS

| | | | |
|---|---|---|---|
| 1,847,065 A | 2/1932 | Munch | |
| 2,733,064 A * | 1/1956 | Martin | 271/224 |
| 2,738,973 A * | 3/1956 | Koch | 271/189 |
| 2,836,418 A * | 5/1958 | Blattner et al. | 271/183 |
| 2,904,335 A * | 9/1959 | Rabinow | 271/219 |
| 2,926,392 A | 3/1960 | Jackson | |
| 2,960,023 A | 11/1960 | Greiner et al. | |
| 3,022,999 A * | 2/1962 | Mead | 271/224 |
| 3,095,343 A | 6/1963 | Berger | |
| 3,362,707 A * | 1/1968 | Lauren | 271/218 |
| 3,370,848 A * | 2/1968 | Bartlett | 271/221 |
| 3,376,609 A | 4/1968 | Kalwaites | |
| 3,566,451 A | 3/1971 | Weigand | |
| 3,592,371 A | 7/1971 | Wyatt et al. | |
| 3,608,024 A | 9/1971 | Yazawa et al. | |
| 3,724,037 A | 4/1973 | Nicholson et al. | |
| 3,737,950 A | 6/1973 | Bolliand et al. | |
| 3,827,113 A | 8/1974 | Vidal et al. | |
| 3,840,941 A | 10/1974 | Neveu | |
| 3,860,127 A * | 1/1975 | Fassman | 414/791.2 |
| 3,907,128 A * | 9/1975 | Cathers | 414/788.9 |
| 3,912,258 A * | 10/1975 | Martin | 271/184 |
| 3,966,196 A * | 6/1976 | Simeth | 271/218 |
| 4,190,241 A | 2/1980 | Krueger | |
| 4,319,744 A * | 3/1982 | Nagel et al. | 271/222 |
| 4,385,757 A * | 5/1983 | Muller | 271/189 |
| 4,514,128 A * | 4/1985 | Hedrick | 414/790.5 |
| 4,640,161 A | 2/1987 | Kurk | |
| 4,664,368 A * | 5/1987 | Bouwens et al. | 271/209 |
| 4,961,805 A | 10/1990 | Siebert | |
| 5,060,351 A | 10/1991 | Street | |
| 5,060,929 A * | 10/1991 | Kohlmann | 271/218 |
| 5,168,786 A | 12/1992 | Huggins et al. | |
| 5,230,764 A | 7/1993 | Moll | |
| 5,241,731 A | 9/1993 | Stuart | |
| 5,253,762 A * | 10/1993 | Duncan | 209/552 |
| 5,332,210 A * | 7/1994 | Silverberg et al. | 271/220 |
| 5,355,567 A | 10/1994 | Holliday | |
| 5,417,912 A | 5/1995 | Merry | |
| 5,431,530 A * | 7/1995 | Kobayashi et al. | 414/794.4 |
| 5,435,541 A * | 7/1995 | Fornay et al. | 271/189 |
| 5,516,091 A * | 5/1996 | Nakayama | 271/182 |
| 5,535,576 A * | 7/1996 | Walintschek | 53/501 |
| 5,779,432 A * | 7/1998 | Pena | 414/794.4 |
| 6,286,403 B1 | 9/2001 | Rosenthal et al. | |
| 6,491,492 B1 * | 12/2002 | Cook | 414/789.9 |
| 6,494,450 B2 * | 12/2002 | Tsurumaki | 271/224 |
| 6,554,937 B1 | 4/2003 | Kenmochi et al. | |
| 6,572,101 B2 * | 6/2003 | Kaya et al. | 271/210 |
| 6,585,842 B1 | 7/2003 | Bompard et al. | |
| 6,743,392 B2 | 6/2004 | Tanaka et al. | |
| 6,780,264 B2 | 8/2004 | Nakata et al. | |
| 7,156,011 B2 | 1/2007 | Morris et al. | |
| 7,300,053 B2 * | 11/2007 | Asano | 271/224 |
| 7,339,675 B2 * | 3/2008 | Nishida et al. | 356/429 |
| 7,536,761 B2 | 5/2009 | Nestler et al. | |
| 7,571,524 B2 | 8/2009 | Kawabe et al. | |
| 8,100,038 B2 | 1/2012 | Sandahl | |
| 8,201,429 B1 | 6/2012 | Matsunaga | |
| 8,357,415 B2 | 1/2013 | Furusawa | |
| 8,448,335 B2 | 5/2013 | Lundgren et al. | |
| 2002/0026699 A1 | 3/2002 | Hayashi et al. | |
| 2002/0148061 A1 | 10/2002 | Tanaka et al. | |
| 2003/0000934 A1 | 1/2003 | Tanaka et al. | |
| 2003/0127177 A1 | 7/2003 | Lane | |
| 2003/0172506 A1 | 9/2003 | Guirman et al. | |
| 2004/0149095 A1 | 8/2004 | Miyatake et al. | |
| 2005/0005381 A1 | 1/2005 | Tanaka et al. | |
| 2005/0039285 A1 | 2/2005 | Tanaka et al. | |
| 2005/0066496 A1 | 3/2005 | Ames et al. | |
| 2005/0097695 A1 | 5/2005 | Tanaka et al. | |
| 2005/0097696 A1 | 5/2005 | Tanaka et al. | |
| 2005/0132521 A1 | 6/2005 | Tanaka et al. | |
| 2005/0139513 A1 | 6/2005 | Miller | |
| 2005/0177967 A1 | 8/2005 | Tanaka et al. | |
| 2005/0188490 A1 | 9/2005 | Tanaka et al. | |
| 2005/0193514 A1 | 9/2005 | Tanaka et al. | |
| 2005/0198760 A1 | 9/2005 | Tanaka et al. | |
| 2005/0258589 A1 | 11/2005 | Michler et al. | |
| 2006/0005675 A1 | 1/2006 | Scheffer et al. | |
| 2006/0016035 A1 | 1/2006 | Tanaka et al. | |
| 2006/0016036 A1 | 1/2006 | Tanaka et al. | |
| 2006/0048325 A1 | 3/2006 | Tsuchiya | |
| 2006/0051434 A1 | 3/2006 | Tsuchiya | |
| 2006/0101601 A1 | 5/2006 | Fujiwara et al. | |
| 2006/0156876 A1 | 7/2006 | Sussmeier et al. | |
| 2006/0179989 A1 | 8/2006 | James et al. | |
| 2007/0068353 A1 | 3/2007 | Piucci et al. | |
| 2007/0101564 A1 | 5/2007 | Nestler et al. | |
| 2008/0047087 A1 | 2/2008 | Levy et al. | |
| 2009/0049633 A1 | 2/2009 | Takabayashi et al. | |
| 2009/0165230 A1 | 7/2009 | Tsuchiya et al. | |
| 2009/0172904 A1 | 7/2009 | Tsuchiya et al. | |
| 2009/0196538 A1 | 8/2009 | Liou et al. | |
| 2009/0255078 A1 | 10/2009 | Wada et al. | |
| 2010/0000382 A1 | 1/2010 | Maddalon | |
| 2010/0015383 A1 | 1/2010 | Yamada | |
| 2010/0022978 A1 | 1/2010 | Kasai et al. | |
| 2010/0058907 A1 | 3/2010 | Kern | |
| 2010/0122613 A1 | 5/2010 | Sandahl | |
| 2010/0154156 A1 | 6/2010 | Takabayashi et al. | |
| 2010/0180745 A1 | 7/2010 | Hall | |
| 2011/0138942 A1 | 6/2011 | Murata | |
| 2011/0296965 A1 | 12/2011 | Manek-Honninger et al. | |
| 2012/0102678 A1 | 5/2012 | Junker et al. | |
| 2012/0132046 A1 | 5/2012 | Supe-Dienes | |
| 2012/0135227 A1 | 5/2012 | Kawabe | |
| 2012/0167736 A1 | 7/2012 | Yokoe | |
| 2014/0182429 A1 | 7/2014 | Saito et al. | |

FOREIGN PATENT DOCUMENTS

| | | |
|---|---|---|
| JP | 45-35382 | 11/1970 |
| JP | 48-89917 | 10/1973 |
| JP | 53-45414 | 4/1978 |
| JP | 56-169873 | 12/1981 |
| JP | 61-105364 U | 7/1986 |
| JP | 3-33222 | 2/1991 |
| JP | 5-245090 A | 9/1993 |
| JP | 5-279950 | 10/1993 |
| JP | 5-316909 | 12/1993 |
| JP | 8-49126 | 2/1996 |
| JP | 8-259274 | 10/1996 |
| JP | 9-111644 A | 4/1997 |
| JP | 10-110346 | 4/1998 |
| JP | 11-323718 | 11/1999 |
| JP | 2000296083 A | 10/2000 |
| JP | 2001-246595 | 9/2001 |
| JP | 2001-288639 | 10/2001 |
| JP | 2002069781 A | 3/2002 |
| JP | 2003265390 A | 9/2003 |
| JP | 2003268663 A | 9/2003 |
| JP | 2003-293236 A | 10/2003 |
| JP | 2004-238615 A | 8/2004 |
| JP | 2004223692 A | 8/2004 |
| JP | 2005-040641 A | 2/2005 |
| JP | 2005046645 A | 2/2005 |
| JP | 2005095665 A | 4/2005 |
| JP | 2005111284 A | 4/2005 |
| JP | 2005137929 A | 6/2005 |
| JP | 2005137930 A | 6/2005 |
| JP | 2005137931 A | 6/2005 |
| JP | 2005144198 A | 6/2005 |
| JP | 2005169148 A | 6/2005 |
| JP | 2005199077 A | 7/2005 |
| JP | 2005230573 A | 9/2005 |
| JP | 2005237975 A | 9/2005 |
| JP | 2006015164 A | 1/2006 |
| JP | 2006034990 A | 2/2006 |
| JP | 2006-152485 | 6/2006 |
| JP | 2006-166931 | 6/2006 |
| JP | 2006141483 A | 6/2006 |
| JP | 2006-265762 A | 10/2006 |
| JP | 2007-002390 A | 1/2007 |

(56) References Cited

FOREIGN PATENT DOCUMENTS

| | | |
|---|---|---|
| JP | 2007029135 A | 2/2007 |
| JP | 2007029136 A | 2/2007 |
| JP | 2007-126810 A | 5/2007 |
| JP | 2007111297 A | 5/2007 |
| JP | 2007135666 A | 6/2007 |
| JP | 2007135774 A | 6/2007 |
| JP | 2007136156 A | 6/2007 |
| JP | 2007159612 A | 6/2007 |
| JP | 2007209460 A | 8/2007 |
| JP | 2007209461 A | 8/2007 |
| JP | 2007236690 A | 9/2007 |
| JP | 2007-283086 | 11/2007 |
| JP | 2008006260 A | 1/2008 |
| JP | 2008119171 A | 5/2008 |
| JP | 2008-125603 A | 6/2008 |
| JP | 2009-153914 | 7/2009 |
| JP | 2010-24575 | 2/2010 |
| JP | 2011-062802 A | 3/2011 |
| JP | 2011-084313 A | 4/2011 |
| JP | 4675218 B2 | 4/2011 |
| JP | 4738311 B2 | 8/2011 |
| JP | 4878988 B2 | 2/2012 |
| JP | 2012-115783 A | 5/2012 |
| KR | 20110137660 | 12/2011 |
| WO | 2007/023965 | 3/2007 |
| WO | 2008/099733 A1 | 8/2008 |

OTHER PUBLICATIONS

International Search Report and Written Opinion Mailed Mar. 25, 2014, corresponds to International Application No. PCT/JP2013/085170.

International Search Report and Written Opinion mailed Feb. 18, 2014, corresponds to Internation Application No. PCT/JP2013/085179.

Office Action mailed Apr. 27, 2015, corresponding to U.S. Appl. No. 13/749,726.

International Search Report Mailed Mar. 25, 2014, corresponds to International Application No. PCT/JP2013/085172.

International Search Report Mailed Mar. 18, 2014, corresponds to International Application No. PCT/JP2013/085177.

International Search Report Mailed Apr. 1, 2014, corresponds to International Application No. PCT/JP2013/085233.

\* cited by examiner

STACKING DEVICE AND METHOD OF PRODUCTION OF WEB MEMBER

RELATED APPLICATIONS

The present application is based on, and claims priority from, Japanese Application Number 2013-002855, filed Jan. 10, 2013, the disclosure of which is hereby incorporated by reference herein in its entirety.

TECHNICAL FIELD

The present invention relates to a device which stacks web members, specifically cleaning members and a method of production of a web member.

BACKGROUND ART

In the past, specifically, web members, specifically cleaning members such as shown in PTL 1 have generally been sold packaged together after production. In this case, as means for stacking the web members to bunch them together as a preparatory step to packaging, the stacking device such as shown in FIG. 8 may be considered.

Figure 8:
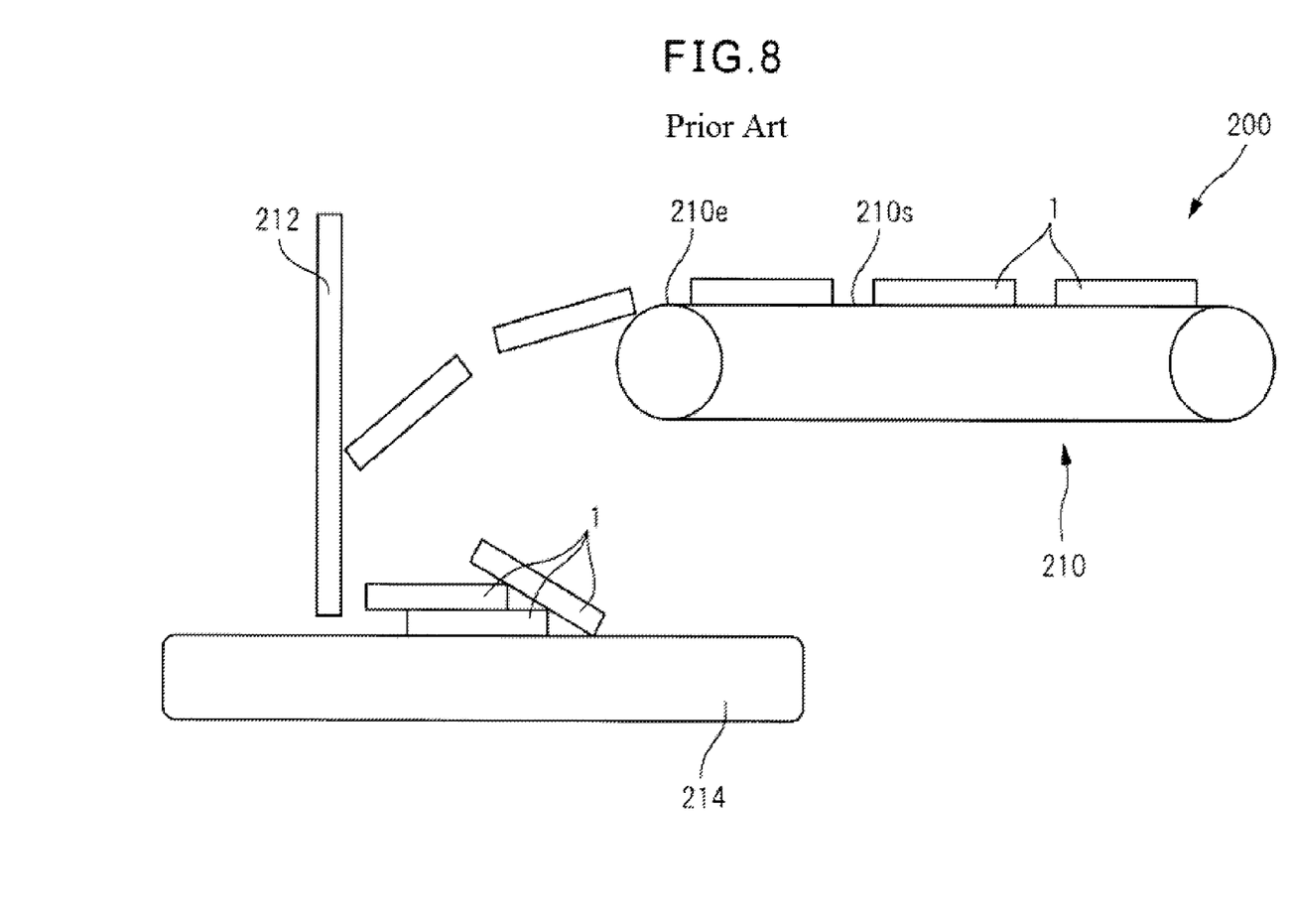
FIG. 8 is a schematic side view which shows a conventional stacking device.

FIG. 8 is a schematic side view which shows a conventional stacking device 200. In the stacking device 200 of FIG. 8, web members, specifically the later explained cleaning members 1 are conveyed in a conveyance direction (MD direction) in a state placed on conveyance surface 210s of a conveyor 210, for example, a belt conveyor and are ejected from an end 210e of the conveyor 210 while drawing a parabolic arc. After that, the web members drop down while drawing a parabolic arc, that is, drop down in the vertical direction while moving in the horizontal direction, contact a stop plate 212, and are stacked on a receiving table 214.

At this time, such web members usually include a certain degree of variations in bulk or weight, dimensions, etc. in the individual web members. Therefore, the web members which drop down while drawing a parabolic arc do not always draw the same path while dropping. Further, the web members are formed from fibers etc. and form flat shapes and are light in weight, so are susceptible to air resistance. Therefore, the members are also liable to flip over when dropping. As a result, as shown in FIG. 8, sometimes the web members are not stacked, sometimes are flipped over, and sometimes are conveyed as they are but cannot move on to the packaging step.

CITATIONS LIST

Patent Literature

[PTL 1] Japanese Patent Publication No. 2007-135774

SUMMARY OF INVENTION

Technical Problem

To solve this problem, an object of the present invention is to provide a stacking device which can suitably stack web members together and to provide a method of producing a web member which includes a step of suitably stacking web members together.

Solution to Problem

To solve the above problem, according to the present invention, there is provided a stacking device which stacks together web members which drop down while drawing a parabolic arc, which stacking device is provided with:

a horizontal movement limit part which limits movement of web members in a horizontal direction, a temporary supporting means which can take a projecting position where it projects from the horizontal movement limit part and a retracted position where it is pulled in from the projecting position and does not stick out from the horizontal movement limit part, and a receiving table which is positioned under the temporary supporting means at the projecting position and stacks the web members, the temporary supporting means temporarily supporting the web member which is dropping off toward the temporarily supporting means when at the projecting position and, after that, shifting to the retracted position to make the web member drop under the temporary supporting means and thereby stack the web members on the receiving table.

Further, to solve the above problem, according to the present invention, there is provided a method of producing a web member which includes a step of using the above-mentioned stacking device to stack the web members.

Advantageous Effects of Invention

According to the stacking device according to the present invention, the web members can be suitably stacked. Further, according to the method of producing a cleaning member according to the present invention, it is possible to provide a method of producing a web member which includes a step of suitably stacking the web members.

DESCRIPTION OF EMBODIMENTS (Cleaning Member (Corresponding to Web Member))

Figure 1:
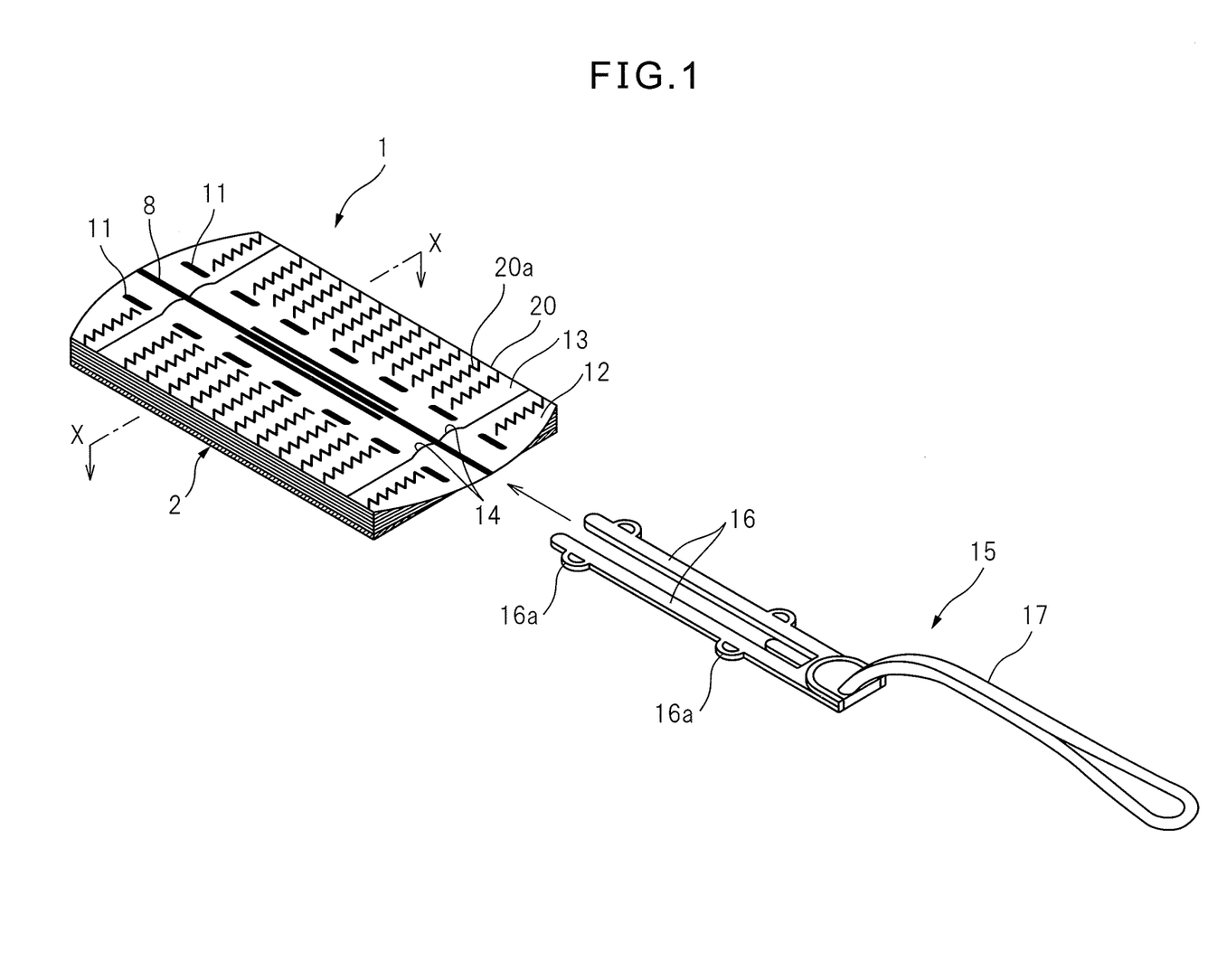
FIG. 1 is a perspective view which shows a cleaning member and a handle which is produced by one method of production.
Figure 2:
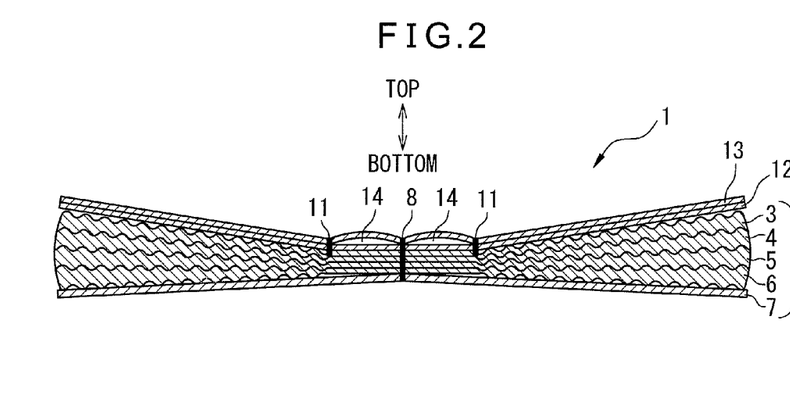
FIG. 2 is a cross-sectional view along the line X-X of FIG. 1.
Figure 3:
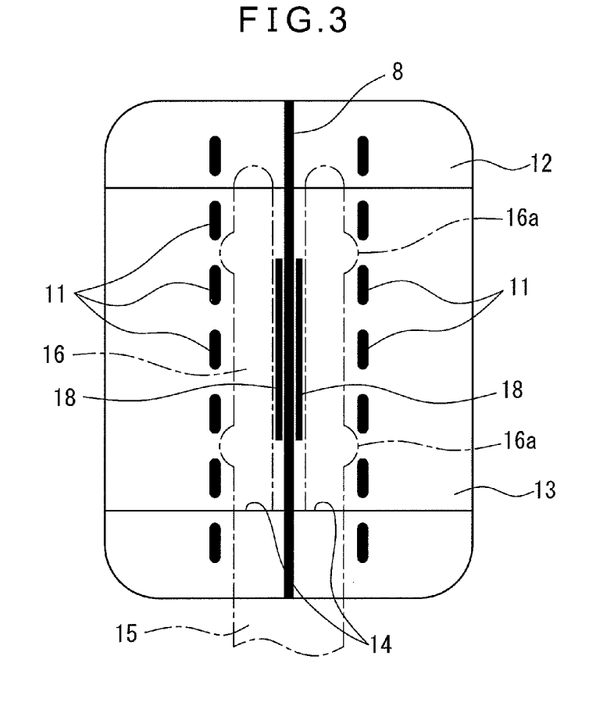
FIG. 3 is a plan view of a cleaning member of FIG. 1.

First, the configuration of a cleaning member 1 of one example of a web member which is stacked by a stacking device according to the present invention and a handle 15 which is fastened to this cleaning member 1 will be explained in brief. FIG. 1 to FIG. 3 show the configuration of the cleaning member 1 according to the present invention and handle 15, where FIG. 1 is a perspective view which shows the cleaning member 1 and handle 15 as a whole, FIG. 2 is a cross-sectional view along the line X-X of FIG. 1, and FIG. 3 is a plan view of a cleaning member 1 of FIG. 1.

That is, this cleaning member 1 is provided with a brush sheet (shaggy part) 2 which has a plurality of fibrous members 3, 4, 5, 6 and a sheet with slits 7 which is overlaid at the bottom part of the fibrous member 6, a substrate sheet 12 which is overlaid at the top part of the brush sheet 2, and a holding sheet 13 which is overlaid at the top part of the substrate sheet 12. Between the substrate sheet 12 and the holding sheet 13, receiving parts 14 are provided for receiving the insert parts 16 of the handle 15. Note that, when referring to FIG. 2, the top direction in FIG. 2 will be explained as "top" and the bottom direction as "bottom".

Note that, the cleaning member 1 is provided with two receiving parts 14 so as to enable insertion of two branched insert parts 16. However, the insert parts 16 may also be branched into three or more parts, or may not be branched. The cleaning member 1 is provided with the receiving parts 14 in accordance with the number of branches at the insert parts 16.

The brush sheet 2, as shown in FIG. 2, is provided with four-layer structure fibrous members 3 to 6 comprised of a first fibrous member 3, a second fibrous member 4 which is overlaid at the bottom part of the first fibrous member 3, a third fibrous member 5 which is overlaid at the bottom part of the second fibrous member 4, and a fourth fibrous member 6 which is overlaid at the bottom part of the third fibrous member 5 and with a sheet with slits 7 which is overlaid at the bottom part of the fourth fibrous member 6 of this four-layer structure fibrous members 3 to 6. Note that, the fibrous members of the brush sheet 2 are not limited to a four-layer structure and may also be a single layer, two-layer, three-layer, or five or more-layer structure. Further, in another cleaning member, the brush sheet 2 is not provided with the sheet with slits 7.

The first fibrous member 3, second fibrous member 4, third fibrous member 5, and fourth fibrous member 6 of the brush sheet 2 are treated by dust catching oil comprised mainly of for example liquid paraffin having the action of promoting adsorption of dust, dirt, etc.

The first fibrous member 3, second fibrous member 4, third fibrous member 5, and fourth fibrous member 6 of the brush sheet 2 can be formed by a fiber bundle, for example, from tows by, for example, opening the tows.

Note that, in the Specification, a "tow", as described in JIS L 0204-3: 1998, section 3.1.24, means a bundle of an extremely large number of filaments aligned together.

As the fiber bundle, for example, a fiber bundle comprised of thermoplastic fibers, a fiber bundle including thermoplastic fibers, etc. may be mentioned. As the material of the fibers forming the fiber bundle, for example, polyethylene, polypropylene, polyethylene terephthalate, nylon, rayon, etc. may be mentioned.

As the fibers forming the fiber bundle, for example, monofilaments and composite fibers, for example, core-sheath type composite fibers or side-by-side type composite fibers etc. may be mentioned. As the composite fibers, core-sheath type composite fibers are preferable. Furthermore, core-sheath type composite fibers with a melting point of the core higher than the melting point of the sheath are more preferable from the viewpoint of thermal bondability.

As the core-sheath type composite fibers, core-sheath type composite fibers with a core comprised of polypropylene or polyethylene terephthalate and a sheath comprised of polyethylene are more preferable and further core-sheath type composite fibers with a core comprised of a polyethylene terephthalate and a sheath comprised of polyethylene are still more preferable.

The denier of the fibers which forms the fiber bundle is preferably 1 to 50 dtex, more preferably 2 to 10 dtex. The fiber bundle may include a plurality of types of fibers which have the same denier or may include one or more types of fibers which have different deniers.

The fiber bundle may also be a bundle of slit fibers (fibers obtained by cutting and stretching a film in an elongated manner), split fibers (fibers obtained by dividing an elongated film into a net structure), etc.

In the cleaning members 1, the fibers which form the fiber bundle are comprised of crimped fibers. By forming the fibers by crimped fibers, it is possible to increase the bulk of the fiber bundle and possible to make the crimped parts structures which easily take in dust, dirt, etc. In another cleaning member, the fibers which form the fiber bundle are not crimped.

The sheet with slits 7, as explained later, in the same way as the substrate sheet 12 and holding sheet 13, is formed from a nonwoven fabric which is comprised of thermoplastic fibers (thermal bond fibers) or a nonwoven fabric which includes thermoplastic fibers and is formed into a rectangular shape of substantially the same width and substantially the same length as the substrate sheet 12. The sheet with slits 7 is provided with sawtooth shaped slits (not shown) at predetermined intervals across the entire sheet with slits 7. Due to the slits, across the entire length of the two edge parts in the width direction of the sheet with slits 7, the two edges are formed with sawtooth shaped reed-shaped parts (not shown).

As shown in FIG. 1 to FIG. 3, at the top part of the first fibrous member 3 of the brush sheet 2, the substrate sheet 12 and the holding sheet 13 are overlaid in that order. Between the substrate sheet 12 and the holding sheet 13, receiving parts 14 are provided for insertion of insert parts 16 of the handle 15.

The substrate sheet 12 and the holding sheet 13 have rectangular shapes. As shown in FIG. 3, the two sheets 12 and 13 are set to the same dimensions in the width direction (left-right direction of FIG. 3), while the substrate sheet 12 is set longer than the holding sheet 13 in dimension in the length direction (up-down direction of FIG. 3). The holding sheet 13 is overlaid on the top part of the substrate sheet 12 so that two end parts of the substrate sheet 12 in the long direction stick out outward from the two ends of the holding sheet 13 in the long direction by predetermined lengths.

The substrate sheet 12 and holding sheet 13 are formed from nonwoven fabrics which are comprised of thermoplastic fibers (thermal bond fibers) or nonwoven fabrics which include thermoplastic fibers. As thermoplastic fibers, for example, polyethylene fibers, polypropylene fibers, polyethylene terephthalate fibers, polyethylene and polyethylene terephthalate composite fibers, polyethylene and polypropylene composite fibers, core-sheath type composite fibers comprised, for example, of a core comprised of polyethylene terephthalate and a sheath comprised of polyethylene, etc. may be mentioned. As types of nonwoven fabrics, for example, thermal bond nonwoven fabrics, spunbonded nonwoven fabrics, spunlace nonwoven fabrics, etc. may be mentioned.

In another cleaning member, the substrate sheet and the holding sheet are formed from thermoplastic resin films, for example, polyethylene films and polypropylene films. Further, in another cleaning member, the substrate sheet and the holding sheet are formed from laminate sheets of nonwoven fabrics and resin films.

The substrate sheet 12 and the holding sheet 13 are integrally melt bonded by a later explained first melt bonded part forming device 158 together with all of the layers of the brush sheet 2 (first fibrous member 3, second fibrous member 4, third fibrous member 5, fourth fibrous member 6, and sheet with slits 7), whereby the cleaning member 1, as shown in FIG. 1 to FIG. 3, is formed with a first melt bonded part 8 extending in the long direction at the center part in the width direction. Furthermore, the substrate sheet 12 and the holding sheet 13 are integrally melt bonded at the two sides of the first melt bonded part 8 (left and right in FIG. 2) by a later explained second melt bonded part forming device 134 together with one layer of the brush sheet 2 (first fibrous member 3), whereby the second melt bonded parts 11 are formed. Two second melt bonded parts 11 are respectively formed in a row intermittently in the long direction. By the first fibrous member 3 being melt bonded with the substrate sheet 12 and the holding sheet 13, the first fibrous member 3 tracks movement of these sheets 12 and 13, so in the state of use, the brush sheet 2 easily becomes broader and therefore the cleaning efficiency is improved.

The substrate sheet 12 and the holding sheet 13 are melt bonded at the first melt bonded part 8 with all layers of the brush sheet 2 (first fibrous member 3, second fibrous member 4, third fibrous member 5, fourth fibrous member 6, and sheet with slits 7) and is melt bonded with the first fibrous member 3 of the brush sheet 2 at the two second melt bonded parts 11. Due to this, between the substrate sheet 12 and the holding sheet 13, a pair of receiving parts 14 are formed comprised of bag-shaped spaces which are defined by the first melt bonded part 8 and the two second melt bonded parts 11, which extend in the long direction of the substrate sheet 12 and the holding sheet 13, and which are open at the two ends in the long directions. As a result, the receiving parts 14 can receive the insert parts 16 of the handle 15.

The substrate sheet 12 and the holding sheet 13 are melt bonded by a later explained second melt bonded part forming device 134 with the first fibrous member 3 of the brush sheet 2 at the center parts of these. A pair of melt bonding lines 18 are further formed at a predetermined interval in the width direction of the substrate sheet 12 and the holding sheet 13. Between the pair of melt bonding lines 18, the first melt bonded part 8 is formed. The pair of melt bonding lines 18 are marks for management of the position of the first melt bonded part 8 at the stage of production. By managing whether the first melt bonded part 8 is arranged between the pair of melt bonding lines 18 by sensors etc., it is possible to separate good products and bad products.

The two second melt bonded parts 11 are provided intermittently at several locations in the long directions of the substrate sheet 12 and the holding sheet 13. By engaging the arc shaped projections 16a of the insert parts 16 of the handle 15 with nonmelt bonded parts of the two second melt bonded part 11, the insert parts 16 of the handle 15 can be prevented from being pulled out from the receiving parts 14.

Further, the two edge parts of the substrate sheet 12 and the holding sheet 13 in the width direction (outside parts of two second melt bonded parts 11), as shown in FIG. 1, are provided with sawtooth shaped slits 20a at predetermined intervals along the long direction. Due to the slits 20a, the two edge parts are provided with sawtooth shaped reed-shaped parts 20. In another cleaning member, the substrate sheet 12 and the holding sheet 13 are not provided with sawtooth shaped slits 20a and therefore the reed-shaped parts 20 are not provided.

Note that the handle 15 is formed from a plastic etc. As shown in FIG. 1, it has a pair of rectangular plate shaped insert parts 16 which are arranged in parallel to each other, a pair of arc-shaped projections 16a which stick out from the outside surfaces of the two ends parts in the long directions of the insert parts 16, and a holder 17 which is provided integrally with one of the end parts of the insert parts 16.

By inserting the two insert parts 16 of the handle 15 inside the two receiving parts 14 of the cleaning member 1 configured in this way and respectively engaging the projections 16a with non-melt bonded parts of the two second melt bonded parts 11, the cleaning member 1 is attached to the handle 15.

Further, by holding the holder 17 of the handle 15, bringing the brush sheet 2 into contact with a location being cleaned, and making it move in the desired direction, the dust, dirt, etc. of the location being cleaned is trapped by the brush sheet 2 and therefore the location being cleaned is cleaned.

(Method of Production of Cleaning Member)

Figure 4:
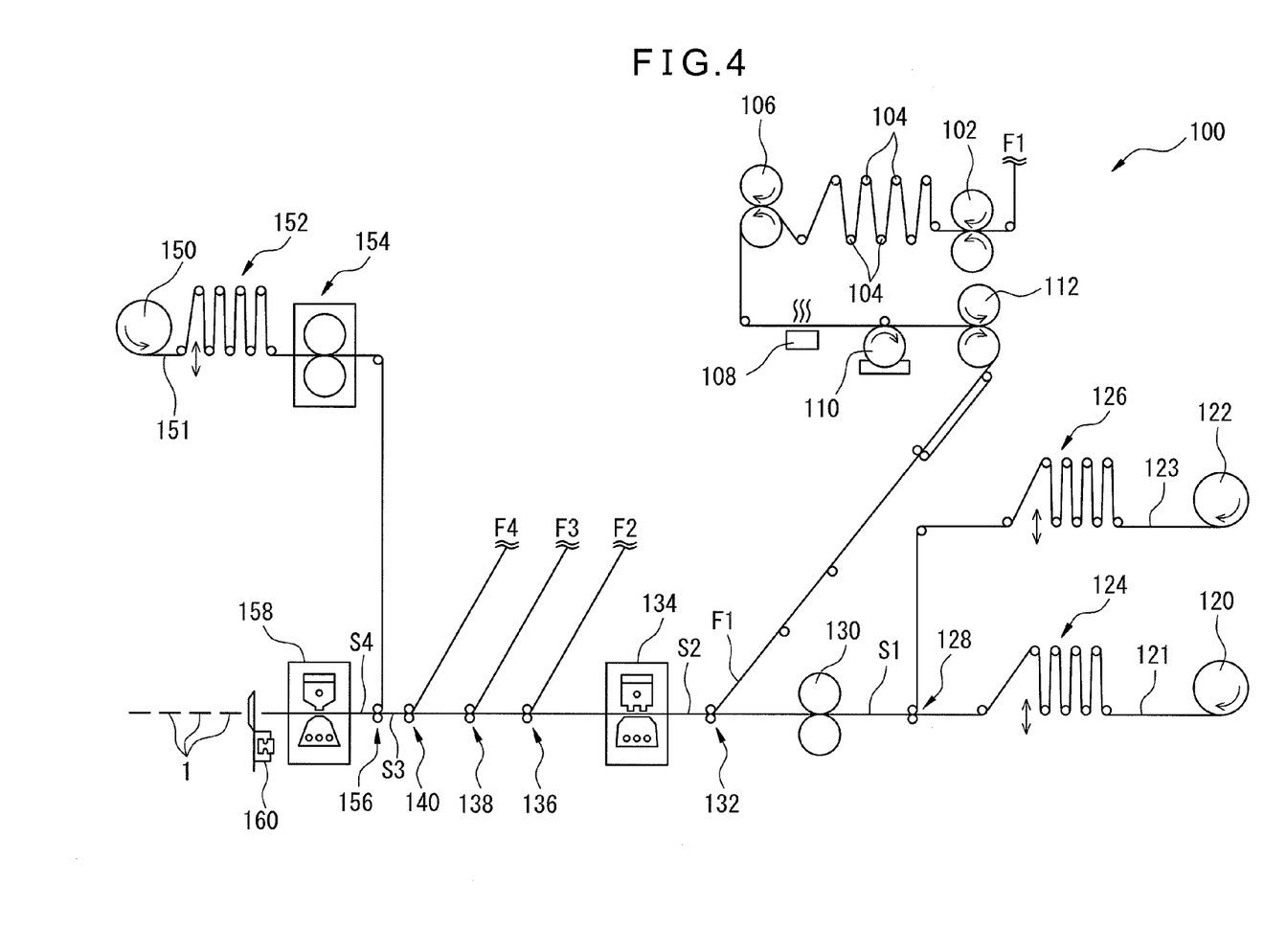
FIG. 4 is a schematic view for explaining a method of producing a cleaning member of FIG. 1.

Next, an embodiment of the method of production of the above-mentioned cleaning member 1 will be explained. FIG. 4 is a schematic view for explaining the method for producing the cleaning member 1 using a production system 100.

First, in the above-mentioned cleaning member 1, a crimped first fiber bundle F1 is taken out from a container (not shown) and is fed to first nip rolls 102. The first nip rolls 102 rotate at a certain peripheral velocity V1 whereby the first fiber bundle F1 is conveyed in the conveyance direction MD. After passing through the first nip rolls 102, the first fiber bundle F1 passes through the tension rolls 104 and reaches the second nip rolls 106.

The peripheral velocity V2 of the second nip rolls 106 is faster than the peripheral velocity V1 of the first nip rolls 102. Due to this, between these nip rolls 102 and 106, the first fiber bundle F1 is given tension. As a result, the first fiber bundle F1 is opened.

Here, the tension rolls 104, for example, are formed from solid steel so as to become heavier in mass. The mass of the tension rolls 104 means that a considerable degree of force is required to rotate the tension rolls 104 by their inertia. As a result, the speed of movement of the first fiber bundle F1 which turns the tension rolls 104 while advancing from the first nip rolls 102 toward the second nip rolls 106 does not rapidly increase.

The tension rolls 104 are arranged to be able to gradually open the first fiber bundle F1 by the stroke between the first nip rolls 102 and the second nip rolls 106 becoming longer.

The first fiber bundle F1 which has passed through the second nip rolls 106 passes through an air feeder 108 and oil applicator 110 and then reaches third nip rolls 112. The peripheral velocity V3 of the third nip rolls 112 is slower than the peripheral velocity V2 of the second nip rolls 106. Therefore, the first fiber bundle F1 which is positioned between the second nip rolls 106 and the third nip rolls 112 is eased in the tension which was imparted and, further, the first fiber bundle F1 is further opened and the width of the first fiber bundle F1 is expanded.

Between the second nip rolls 106 and the third nip rolls 112, the air feeder 108 is provided. Due to this, the first fiber bundle F1 is further opened.

Between the second nip rolls 106 and third nip rolls 112, the oil applicator 110 is further provided. The oil applicator 110 applies dust catching oil which has the action of promoting adsorption of dust, dirt, etc. to the first fiber bundle F1. The dust catching oil is, for example, oil mainly comprised of liquid paraffin.

The first fiber bundle F1 which has passed the third nip rolls 112 proceeds to the merging part 132 after ending the opening step.

On the other hand, the nonwoven fabric 121 which forms the substrate sheet 12 is continuously unrolled from a nonwoven fabric roll 120. The nonwoven fabric 121 passes through dancer rolls 124 which include a plurality of rolls arranged in two top/bottom stages and where the rolls which are positioned at the bottom stage rock up and down and then is intermittently conveyed in the conveyance direction MD. Here, "intermittently conveyed" means the nonwoven fabric 121 is repeatedly advanced by a certain distance, for example, substantially the width direction length of the cleaning member 1, in the MD direction, then stopped from being conveyed for a certain time. By the nonwoven fabric being intermittently conveyed in this way, it is possible to secure the time for melt bonding the component elements of the later explained multilayer web.

Similarly, the nonwoven fabric 123 which forms the holding sheet 13 is continuously unrolled from a nonwoven fabric roll 122. The nonwoven fabric 123 is passed through dancer rolls 126 which include a plurality of rolls arranged in two top/bottom stages and where the rolls which are positioned at the bottom stage rock up and down and is then intermittently conveyed.

The nonwoven fabrics 121, 123 merge at the merging part 128 to form a multilayer web S1. The multilayer web S1 passes the gather cutters 130 which have sawtooth shaped blades (not shown) intermittently formed at their surfaces in the peripheral direction. Due to this, the slits 20a which are shown in FIG. 1 are formed at the substrate sheet 12 and the holding sheet 13.

Next, the multilayer web S1 merges at the merging part 132 with the above-mentioned fiber bundle F1 to form the multilayer web S2. At this time, the first fiber bundle F1 is configured so as to enable a certain degree of slack between the third nip rolls 112 and merging part 132. Due to this, there is the same action as if dancer rollers were provided between them.

In the method of production according to the present embodiment, the second melt bonded part forming device 134 is used to melt bond the substrate sheet 12, holding sheet 13, and first fiber bundle F1 included in the multilayer web S2 whereby two second melt bonded parts 11 (FIG. 3) are respectively formed in a row. Due to this, the multilayer web S2 is melt bonded across its thickness direction. The second melt bonded part forming device 134, for example, is a heat seal device, ultrasonic wave sealing device, etc. In the method of production according to the present embodiment, a heat seal device is used.

After this, at the multilayer web S2, a second fiber bundle F2 to fourth fiber bundle F4 which are opened by the same method as the first fiber bundle F1 are successively overlaid whereby a multilayer web S3 is formed.

On the other hand, the nonwoven fabric 151 which forms the sheet with slits 7 is continuously unrolled from a nonwoven fabric roll 150. The nonwoven fabric 151 is passed through dancer rolls 152 and then intermittently conveyed and, further, passes through gather rolls 154. The gather rolls 154 have continuous sawtooth shaped blades (not shown) at their surfaces in their peripheral directions. Due to this, the nonwoven fabric 151 which passes the gather rolls 154 is formed with sawtooth shaped slits (not shown). Due to the above, the sheet with slits 7 is formed from the nonwoven fabric 151.

The sheet with slits 7 merges with the multilayer web S3 at the merging part 156 to form the multilayer web S4.

In the method of production according to the present embodiment, the first melt bonded part forming device 158 is used to melt bond the multilayer web S4 as a whole whereby the multilayer web S4 is formed with the first melt bonded part 8 (see FIG. 3 etc.). Due to this, the multilayer web S4 is melt bonded across its thickness direction. The first melt bonded part forming device 154 is, for example, a heat seal device, ultrasonic wave sealing device, etc. In the method of production according to the present embodiment, a heat seal device is used.

The multilayer web S4 which has passed the first melt bonded part forming device 158 is cut by a cutting device 160 whereby the cleaning member 1 is obtained.

The cleaning member 1 which is produced by the method of production according to the present embodiment includes a sheet with slits 7, but a cleaning member which is produced by a method of production according to another embodiment does not include a sheet with slits.

Further, in the cleaning member 1 which is produced by the method of production according to the present embodiment, the receiving parts 14 are positioned at the surface of the cleaning member 1. In the method of production of a cleaning member according to another embodiment, by changing the order of overlay of the substrate sheet 12 and the holding sheet 13 as well as the fibrous members 3 to 6, the receiving parts 14 are arranged between any adjoining fibrous members 3 to 6. Due to this, the two surfaces of the cleaning member 1 can be used for cleaning. At this time, to facilitate insertion of the insert parts 16 into the receiving parts 14, the dimensions of the substrate sheet 12 and the holding sheet 13 in the long direction (up-down direction of FIG. 3) are preferably made longer than the fibrous members 3 to 6. These dimensions can be freely determined. Further, at this time, the sheet with slits 7 need not be used or two sheets with slits 7 may be arranged at the two surfaces of the cleaning member 1.

(Embodiment of Stacking Device)

From here, referring to FIG. 5 to FIG. 7, a stacking device according to an embodiment of the present invention will be explained.

Figure 5:
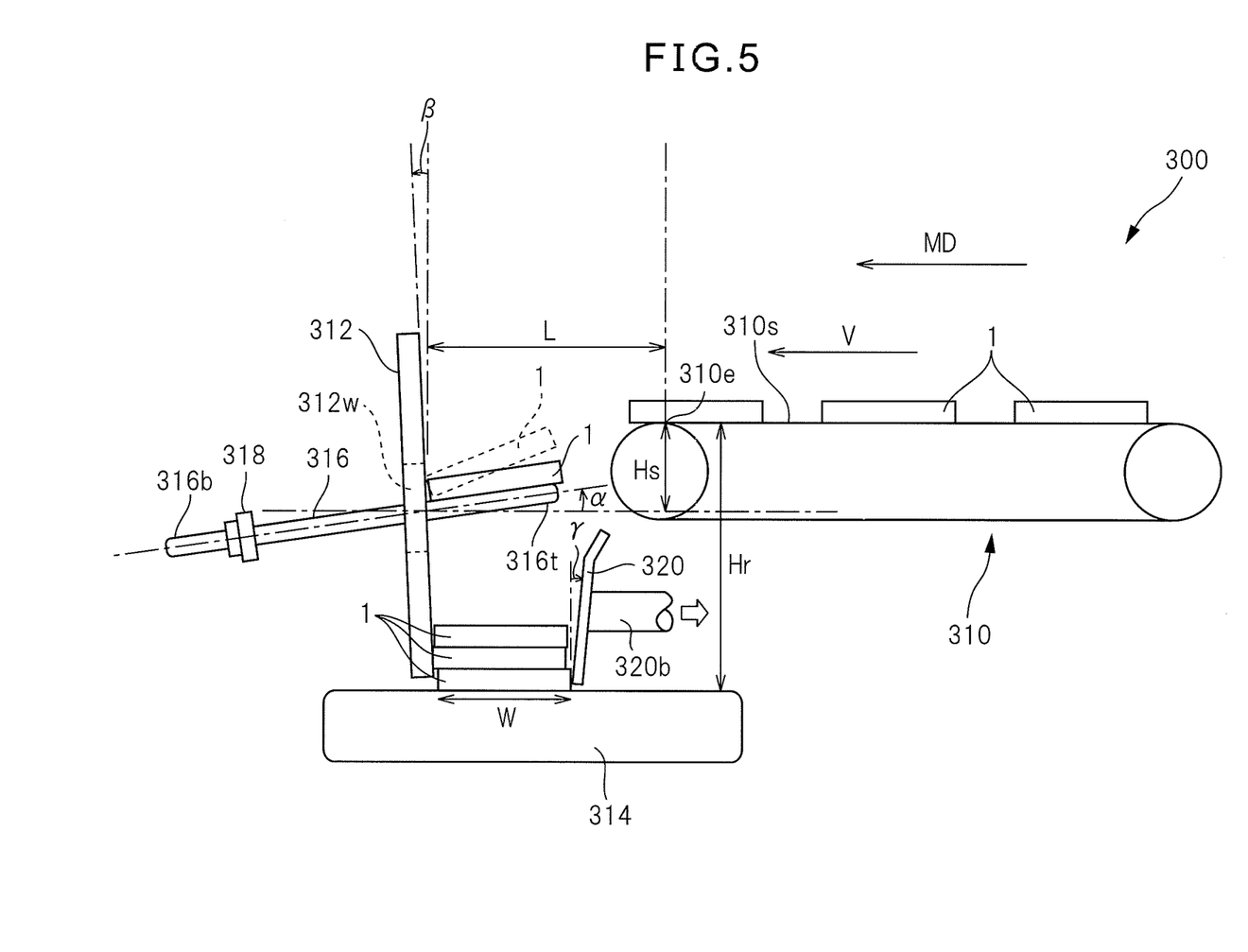
FIG. 5 is a schematic side view of a stacking device with a temporary supporting means at a projecting position according to an embodiment of the present invention.
Figure 6:
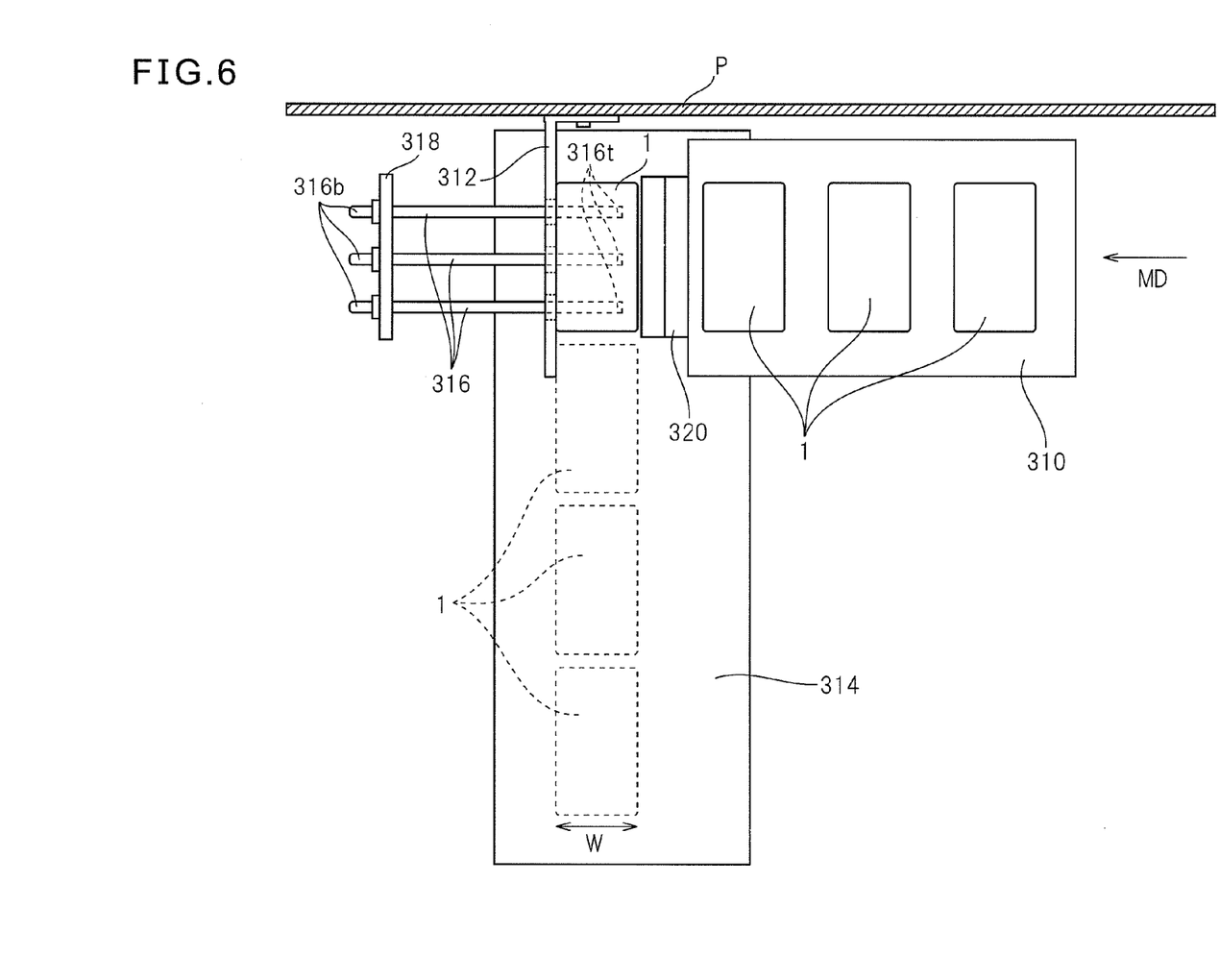
FIG. 6 is a schematic top view of a stacking device of FIG. 5.

FIG. 5 is a schematic side view of a stacking device 300 according to an embodiment of the present invention in the state where the temporary supporting means is at a projecting position, while FIG. 6 is a schematic top view of the stacking device 300 of FIG. 5. The stacking device 300 according to the present embodiment is provided with a receiving plate 312 (corresponding to horizontal movement limit part) which limits movement in the horizontal direction of a cleaning member 1 (corresponding to web member) which is dropping off while drawing a parabolic arc, support rods 316 (corresponding to temporary supporting means) which can take a projecting position where they stick out from the receiving plate 312 and a retracted position where they are pulled in from the projecting position and do not stick out from the receiving plate 312, a receiving table 314 which is positioned below the support rods 316 at the projecting position and stacks the cleaning members 1, sensors (not shown) which monitor the positions of the cleaning members 1 etc. at the stacking device 300, and a control unit (not shown). Further, the detection signals which are transmitted from the sensors are used as the basis for the control unit to control the components of the stacking device 300 and thereby suitably stack the cleaning members 1 with each other.

From here, the steps wherein the cleaning members 1 are stacked at the stacking device 300 according to the present embodiment will be explained in order. First, in the stacking device 300 according to the present embodiment, cleaning members 1 which are produced by the method of production according to the above-mentioned embodiment are conveyed one by one in the conveyance direction (MD direction) in the state placed on a conveyance surface 310s of a conveyor 310, for example, a belt conveyor. Further, the cleaning members 1 are ejected from an end 310e of the conveyor 310. After that, the cleaning member 1, as shown by the cleaning member 1 which is shown by the broken line in FIG. 5 as one example, drops down while drawing a parabolic arc, that is, drops down in the vertical direction by gravity while moving in the horizontal direction by inertia.

In the present embodiment, an ejected cleaning member 1 contacts the stop plate 312 whereby its movement in the horizontal direction is restricted, while, as shown in FIG. 5, it is temporarily supported by support rods 316 at a projecting position which they stick out from openings 312w which are provided in the stop plate 312. As a result, the cleaning member 1 reaches the stop plate 312 and is temporarily supported by the support rods 316, so regardless of the path by which each cleaning member 1 drops from the end 310e of the conveyor 310, it assumes a substantially constant posture in the state supported by the support rods 316.

Figure 7:
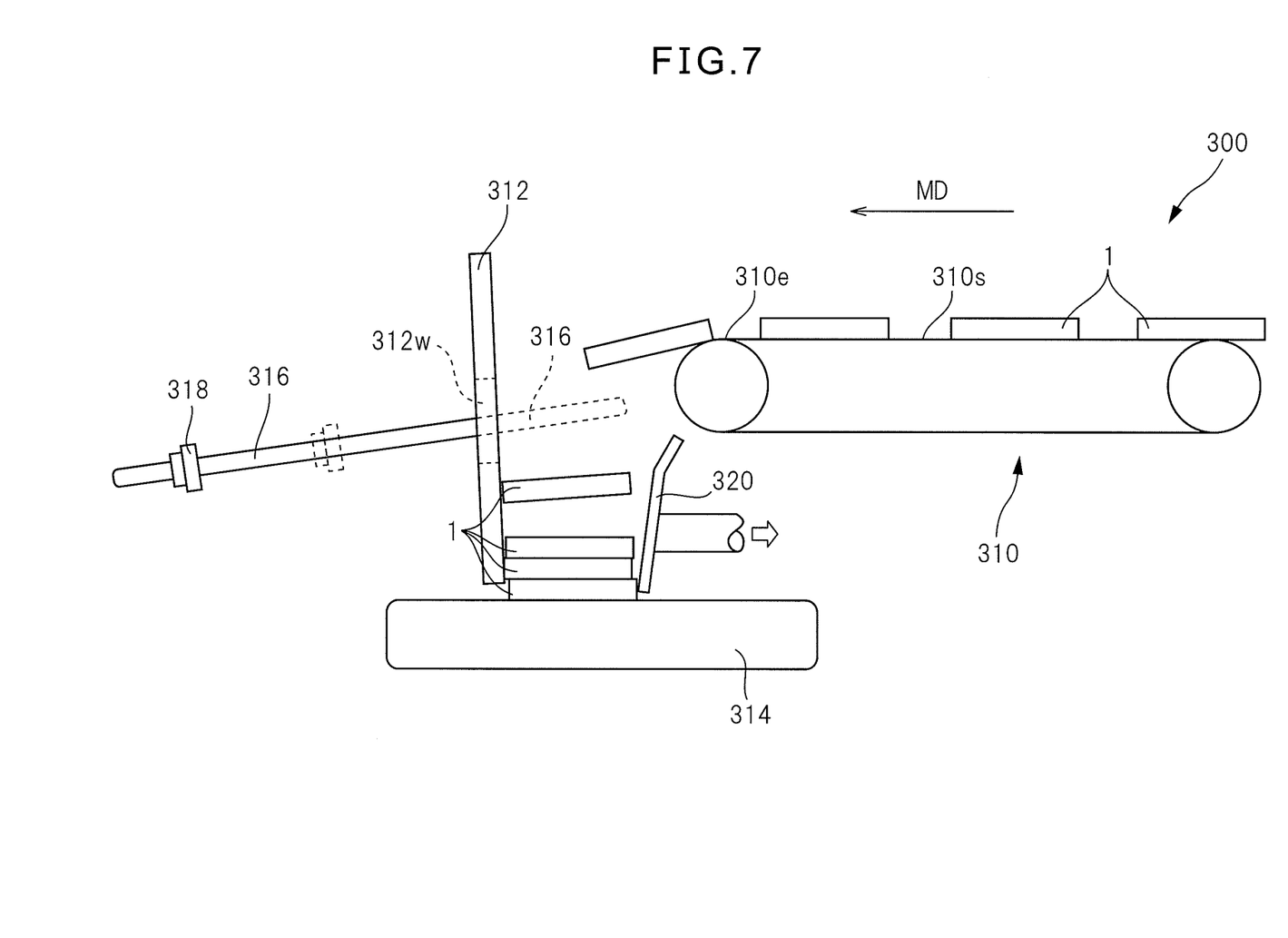
FIG. 7 is a schematic side view of a stacking device with temporary supporting means at a retracted position according to an embodiment of the present invention.

FIG. 7 is a schematic side view of a stacking device according to an embodiment of the present invention in the state where the temporary supporting means is at the retracted position. After the cleaning member 1 is temporarily supported by the support rods 316, the support rods 316, as shown by FIG. 7, are quickly pulled in from the projecting position which is shown by the broken line in the figure along the direction along which the support rods 316 extend and shift to the retracted position. As a result, the cleaning member 1 which was supported at the support rods 316 drops down to the receiving table 314 which is positioned below it without being flipped over. Further, as shown in FIG. 5 and FIG. 6, the support rods 316 again stick out along the direction in which the support rods 316 extend to thereby shift to the projecting position where they support the next cleaning member 1 which is ejected from the end 310e of the conveyor 310.

In this way, the cleaning members 1 which are successively ejected from the end 310e of the conveyor 310 are temporarily supported by the support rods 316, then drop down to the receiving table 314. As a result, the cleaning members 1 are suitably stacked on the receiving table 314.

In the present embodiment, the stacking device 300 is further provided with an aligning plate (corresponding to vertical direction aligning means) 320 which faces the stop plate 312 and is arranged at a height position where the cleaning members 1 are to be stacked. The aligning plate 320 is attached to for example a base (not shown) of the conveyor 310 through a bar 320b which is attached to a surface of the aligning plate 320 opposite to the side which faces the stop plate 312. The distance between the stop plate 312 and the aligning plate 320, specifically the horizontal direction distance at the closest location in the distances between these facing surfaces, is slightly greater than the width W of the cleaning member 1 (FIG. 5 and FIG. 6). In another embodiment, the distance is the same as the width W of the cleaning member 1. As a result, the cleaning members 1 are preferably stacked in the state substantially aligned in the vertical direction. However, in another embodiment, the stacking device 300 is not provided with an aligning plate 320.

Note that, the movement of the support rods 316 from the projecting position to the retracted position and from the retracted position to the projecting position is for example performed by any drive mechanism (not shown) which is attached to a connecting part 318 which connects the support rods 316 integrally together. The above series of operations of the support rods 316 is controlled by a control unit (not shown) based on a detection signal from a sensor part, for example, an infrared sensor. The sensor part is set in advance so as to detect when a cleaning member 1 passes through a predetermined location, for example, the end 310e of the conveyor 310, when a cleaning member 1 reaches the stop plate 312 or the support rods 316, etc. and transmit a detection signal to the control unit. The not shown drive mechanism which drives the support rods 316, for example, includes a crank mechanism which uses a servo motor as a drive source and converts the rotational drive to linear reciprocating motion along the direction in which the support rods 316 extend.

In the present embodiment, the support rods 316 move between the projecting position and retracted position by moving along the direction of extension of the support rods 316, but the present invention is not limited to this. The support rods 316 may move in any direction so long as between the projecting position where they stick out from the stop plate 312 and temporarily support the cleaning member 1 and the retracted position where the support rods 316 are retracted to make the cleaning member 1 drop down from the support rods 316 to the support table 314.

Further, several, for example, three to six, stacked cleaning members 1 are conveyed from the location on the receiving table 314 where the cleaning members 1 are stacked by a suitable conveying means to a packaging step. In the present embodiment, as shown in FIG. 6, the receiving table 314 is a separate conveyor. This separate conveyor is used so that the stacked cleaning members 1, as shown by the broken line in FIG. 6, are conveyed toward the location for executing subsequent step, that is, the packaging step, in a direction vertical to the conveyance direction of the conveyor 310.

Here, while again referring to FIG. 5, the layout of the components of the stacking device 300 will be explained. Here, the horizontal direction distance from the end 310e of the conveyor 310 to the position at the stop plate 312 from which the support rods 316 stick out is defined as "L", the vertical direction distance from the conveyance surface 310s of the conveyor 310 to the receiving table 314 is defined as "Hr", the vertical direction distance from the end 310e of the conveyor 310 to the position at the stop plate 312 from which the support rods 316 stick out is defined as "Hs", the angle from the horizontal direction of the direction in which the support rods 316 extend is defined as "α", the inclination angle of the stop plate 312 from the vertical direction is defined as "β", and the inclination angle of the aligning plate 320 from the vertical direction is defined as "γ". In this case, the values of these L, Hs, Hr, α, β, and γ will differ due to the conveyance speed V of the cleaning members 1 by the conveyor 310 or the bulk, weight, dimensions, etc. of the cleaning members 1, but for example experiments etc. are preferably used to determine the optimum values.

As one example, when the conveyance speed V of the conveyor 310 is 38 m/min, the dimensions of the cleaning member 1 are about a length 170×width 110×thickness 25 mm, and the mass of one cleaning member 1 is about 7.5 g, if L=120 to 160 mm, in particular 140 mm,
Hs=60 to 100 mm, in particular 80 mm,
Hr=200 to 260 mm, in particular 230 mm,
α=0 to 30 degrees, in particular 15 degrees,
β=0 to 6 degrees, in particular 0 degree, and
γ=0 to 30 degrees, in particular 10 degrees, the cleaning members 1 are suitably stacked with each other.

In addition, the speed of movement of the support rods 316 when the support rods 316 move from the projecting position to the retracted position is preferably as fast as possible. Further, the frictional coefficient between the cleaning member 1 and the support rods 316 is preferably low. This is because the cleaning members 1 can hold a constant posture when the support rods 316 drop down.

Note that while not particularly shown, the stop plate 312 as well as three support rods 316, the connecting part 318, and their drive mechanisms (not shown) are attached to the production line facility P (FIG. 6) so as to enable the above-mentioned layout (L, α, and β) to be freely changed. Further, the conveyor 310 and receiving table 314 are preferably attached so that their height positions can be adjusted.

In the present embodiment, the support rods 316 are inclined in the top direction from the bases 316b toward the tips 316t (that is, α>0). As a result, even when the dropping cleaning members 1 do not reach the stop plate 312 and first contact the support rods 316 at the projecting position, after that, they preferably slide on the support rods 316 and easily reach the stop plate 312. However, the support rods 316, in another embodiment, extend in the horizontal direction (that is, α=0) and further, in another embodiment, is inclined in the bottom direction from their bases 316b toward their tips 316t (that is, α<0).

From here, the action of the stacking device 300 according to the present embodiment will be explained.

As explained above, the cleaning members 1 are ejected from the end 310e of the conveyor 310 and drop down while drawing a parabolic arc. After that, the cleaning members 1 move in the horizontal direction until contacting the stop plate 312 and are temporarily supported by the support rods 316 at the projecting position. At this time, the cleaning members 1 which are temporarily supported by the support rods 316 assume a constant posture regardless of the paths or postures by which the cleaning members 1 drop up to then. Therefore, after that, the support rods 316 quickly move from the projecting position to the retracted position, whereby the cleaning members 1 drop down while drawing substantially the same paths. As a result, the cleaning members 1 are suitably stacked on the support table 314.

Further, in the present embodiment, the stacking device 300 is provided with an alignment plate 320, so the cleaning members 1 can be stacked between the stop plate 312 and the aligning plate 320, and, as a result, the cleaning members 1 can be stacked in the state substantially aligned in the vertical direction.

In the present embodiment, the temporary supporting means constituted by the support rods 316 are three rod-shaped members. These are columnar in shape, but the shapes and numbers of the temporary supporting means are not limited to this. For example, in another embodiment, the temporary supporting means is a single plate-shaped member, that plate shape surface is used to temporarily support a web member, and thereby an action similar to the support rods 316 is exhibited. Note that, when the temporary supporting means is comprised of support rods 316, two or more support rods 316 are preferably provided.

In the present embodiment, the receiving table 314 is a separate conveyor. The cleaning members 1 are stacked on the conveyance surface. Further, a sensor (not shown) which detects when the cleaning members 1 have been stacked to a predetermined height or more detects when a predetermined number of cleaning members 1 have been stacked. When this happens, the sensor part sends a detection signal to the control unit (not shown). Receiving the detection signal, the control unit next controls the drive source of the other conveyor such as the servo motor and makes the stacked cleaning members 1 move by a predetermined distance in the conveyance direction. As a result, the cleaning members 1 which drop down from the conveyor 310 after that can be newly stacked on the conveyance surface of the separate conveyor. That is, the conveyance operation of the separate conveyor is stopped while the cleaning members 1 are being stacked, is restarted when a predetermined number of cleaning members 1 have been stacked, then again is stopped after movement by a predetermined distance.

In the present embodiment, while the stacked cleaning members 1 are being conveyed by the separate conveyor, the aligning plate 320 is retracted by a drive mechanism (not shown) in a direction moving away from the stop plate 312 (right direction in FIG. 5). The aligning plate 320 is for preventing the stacked cleaning members 1 from becoming misaligned due to the frictional force which is generated when these cleaning members 1 contact. The drive mechanism of the aligning plate 320 is, for example, controlled by the control unit (not shown) in timing of retraction of the plate and return to the original position in the same way as the above-mentioned support rods 316.

In the present embodiment, the receiving table 314 is separate conveyor, but in another embodiment, it is a simple table. In this case, for example, the cleaning members 1 stacked in predetermined numbers are removed from the receiving table 314 manually by an operator, then are conveyed to a location for performing the packaging step.

Finally, the method of producing a cleaning member 1 according to the present embodiment is finished by packaging the cleaning members 1 which have been suitably stacked using for example the stacking device 300 according to the above embodiment by use of the packaging machine which is described in Japanese Utility Model Publication No. 61-160002, etc.

In the present embodiment, the web member was explained as the cleaning member 1 which is produced by the above method of production. However, the web member may be any member and need not even include the fiber bundles F1 to F4. In another embodiment, the web member is, for example, a single layer or multi-layer flat member which is formed from a nonwoven fabric, woven fabric, or other fabric made of any fiber etc.

While not particularly shown, the above-mentioned control unit is for example comprised of a computer or PLC (programmable logic controller) etc. as a main body. The main body has a processor and a memory. Further, it reads out from the processor and runs a control program which is stored in advance in the memory so as to control the servo motors etc. serving as the drive sources of the components to enable the above-mentioned conveyor 310, the support rods 316, and separate conveyor to operate in concert. That is, the control unit referred to here includes in configuration not only the above-mentioned computer, PLC, or other main body, but also an amplifier etc. for actual positional control of the servo motors.

The present invention is defined as follows:

(1) A stacking device which stacks together web members which drop down while drawing a parabolic arc, which stacking device is provided with:

a horizontal movement limit part which limits movement of web members in a horizontal direction, a temporary supporting means which can take a projecting position where it projects from said horizontal movement limit part and a retracted position where it is pulled in from said projecting position and does not stick out from said horizontal movement limit part, and a receiving table which is positioned under said temporary supporting means at said projecting position and stacks said web members, said temporary supporting means temporarily supporting said web member which is dropping off toward said temporarily supporting means when at said projecting position and, after that, shifting to said retracted position to make said web member drop under said temporary supporting means and thereby stack said web members on said receiving table.

(2) The stacking device as set forth in (1), wherein said temporary supporting means is inclined in a top direction from its base to its tip.

(3) The stacking device as set forth in (1) or (2), wherein said temporary supporting means is a plurality of rod-shaped members.

(4) The stacking device as set forth in any one of (1) to (3), wherein said receiving table is a conveyor which conveys the stacked web members.

(5) The stacking device as set forth in any one of (1) to (4), wherein the device is further provided with a vertical direction aligning means which faces said horizontal movement limit part and is arranged at a height position where said web members are to be stacked, and a distance between said horizontal movement limit part and said vertical direction aligning means is the same as the width of said web members or slightly greater than that distance.

(6) A method of producing a web member which includes a step of using a stacking device as set forth in any one of (1) to (5) to stack said web members.

The present application claims the benefit of the following patent applications, and the entire disclosure of which is incorporated herein by reference:

Japanese Patent Application No. 2012-289181 filed on Dec. 29, 2012, and US patent application claiming the priority thereof, Japanese Patent Application No. 2012-289182 filed on Dec. 29, 2012, and US patent application claiming the priority thereof, Japanese Patent Application No. 2012-289174 filed on Dec. 29, 2012, and US patent application claiming the priority thereof, Japanese Patent Application No. 2012-289189 filed on Dec. 29, 2012, and US patent application claiming the priority thereof, Japanese Patent Application No. 2012-289175 filed on Dec. 29, 2012, and US patent application claiming the priority thereof, Japanese Patent Application No. 2012-289188 filed on Dec. 29, 2012, and US patent application claiming the priority thereof, Japanese Patent Application No. 2012-289179 filed on Dec. 29, 2012, and US patent application claiming the priority thereof, Japanese Patent Application No. 2012-289177 filed on Dec. 29, 2012, and US patent application claiming the priority thereof, Japanese Patent Application No. 2012-289184 filed on Dec. 29, 2012, and US patent application claiming the priority thereof, Japanese Patent Application No. 2012-289178 filed on Dec. 29, 2012, and US patent application claiming the priority thereof, Japanese Patent Application No. 2012-289176 filed on Dec. 29, 2012, and US patent application claiming the priority thereof, as well as, Japanese Patent Application No. 2013-002857 filed on Jan. 10, 2013, and US patent application claiming the priority thereof.

Note that, the cleaning member illustrated in each figure is an example of the cleaning members which can be produced using the method of producing a cleaning member and the system of producing a cleaning member according to the present disclosure. The method of producing a cleaning member and the system of producing a cleaning member according to the present disclosure can be used to produce a cleaning member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-111297, 2007-135666, 2007-136156, 2007-159612, 2007-236690, 2008-006260, 2008-119171, and 2007-029135, and the entire disclosure of which is incorporated herein by reference.

The method of producing a cleaning member and the system of producing a cleaning member according to the present disclosure can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, and the entire disclosure of which is incorporated herein by reference.

REFERENCE SIGNS LIST 1 cleaning member (web member)
312 stop plate (horizontal movement limit part)
314 receiving table, separate conveyor (conveyor)
316 support rod (temporary supporting means)

The invention claimed is:

1. A stacking device for stacking together web members which drop down along a parabolic curve, said stacking device comprising:

a horizontal movement limit part configured to limit movement of the web members in a horizontal direction;

a temporary supporting member configured to have a projecting position where the temporary supporting member projects from said horizontal movement limit part and a retracted position where the temporary supporting member is pulled in from said projecting position and does not stick out from said horizontal movement limit part;

a receiving table positioned under said temporary supporting member at said projecting position to stack said web members; and a vertical direction aligning member facing said horizontal movement limit part and arranged at a height position where said web members are to be stacked, wherein said temporary supporting member is configured to be at the projecting position to temporarily support each one of said web members which is dropping off toward said temporary supporting member and, after that, said temporary supporting member is configured to shift to said retracted position to make said web member drop under said temporary supporting member and thereby stack said web members on said receiving table, the horizontal movement limit part is inclined from a vertical direction of the stacking device, a distance between said horizontal movement limit part and said vertical direction aligning member is configured to be the same as a width of said web members or slightly greater than the width, the vertical direction aligning member is inclined from the vertical direction of the stacking device by a predetermined angle, said temporary supporting member includes a base and a tip opposite to the base, and the temporary supporting member is inclined upward from the base to the tip in both the projecting position and the retracted position.

2. The stacking device as set forth in claim 1, wherein said temporary supporting member includes a plurality of rod-shaped members.

3. The stacking device as set forth in claim 1, wherein said receiving table is a conveyor configured to convey the stacked web members.

4. The stacking device as set forth in claim 1, wherein the temporary supporting member is configured to perform a linear reciprocating motion between the projecting position and the retracted position.

5. The stacking device as set forth in claim 1, wherein the temporary supporting member is inclined upward from the base to the tip in both the projecting position and the retracted position while the tip always faces the vertical direction aligning member.

6. The stacking device as set forth in claim 1, wherein said temporary supporting member is configured to directly support said each one of said web members dropping off toward said receiving table.

7. The stacking device as set forth in claim 1, wherein said temporary supporting member is configured to repeatedly shift between the projecting position and the retracted position, and every time said temporary supporting member is at the projecting position, said temporary supporting member is arranged to temporarily support only one of said web members dropping off toward said receiving table before said temporary supporting member shifting to the retracted position.

8. A method of producing a web member, comprising using a stacking device to stack web members which drop down along a parabolic curve, wherein said stacking device includes:

a horizontal movement limit part configured to limit movement of web members in a horizontal direction;

a temporary supporting member configured to have a projecting position where the temporary supporting member projects from said horizontal movement limit part and a retracted position where the temporary supporting member is pulled in from said projecting position and does not stick out from said horizontal movement limit part;

a receiving table positioned under said temporary supporting member at said projecting position to stack said web members; and a vertical direction aligning member facing said horizontal movement limit part and arranged at a height position where said web members are to be stacked, wherein said using the stacking device includes:

temporarily supporting, by the temporary supporting member, each one of said web members which is dropping off toward said temporary supporting member when said temporary supporting member is at the projecting position, and then shifting the temporary supporting member from said projecting position to said retracted position to make said web member drop under said temporary supporting member to stack said web members on said receiving table, wherein the horizontal movement limit part is inclined from a vertical direction of the stacking device, a distance between said horizontal movement limit part and said vertical direction aligning member is configured to be the same as a width of said web members or slightly greater than the width, the vertical direction aligning member is inclined from the vertical direction of the stacking device by a predetermined angle, said temporary supporting member includes a base and a tip opposite to the base, and the temporary supporting member is inclined upward from the base to the tip in both the projecting position and the retracted position.

9. The method as set forth in claim 8, wherein said temporary supporting member includes a plurality of rod-shaped members.

10. The method as set forth in claim 8, wherein said receiving table is a conveyor which conveys the stacked web members.

11. The method as set forth in claim 8, wherein the temporary supporting member performs a linear reciprocating motion between the projecting position and the retracted position.

12. The method as set forth in claim 8, wherein the temporary supporting member is inclined upward from the base to the tip in both the projecting position and the retracted position while the tip always faces the vertical direction aligning member.

13. The method as set forth in claim 8, wherein, in said temporarily supporting, said temporary supporting member directly supports said each one of said web members dropping off toward said receiving table.

14. The method as set forth in claim 8, wherein each and every one of said web members dropping off toward said receiving table is (i) temporarily, individually and directly supported by said temporary supporting member at the projecting position, and then (ii) further dropped on said receiving table when said temporary supporting member is subsequently shifted from said projecting position to said retracted position.

* * * * *